United States Patent [19]

Impink, Jr. et al.

[11] Patent Number: 4,877,575

[45] Date of Patent: Oct. 31, 1989

[54] CORE REACTIVITY VALIDATION COMPUTER AND METHOD

[75] Inventors: Albert J. Impink, Jr., Murrysville; Francis L. Langford, Jr., Forest Hills; Louis R. Grobmyer, North Huntingdon; William K. Luinetti, Salem Township, Westmoreland County, all of Pa.

[73] Assignee: Westinghouse Electric Corp., Pittsburgh, Pa.

[21] Appl. No.: 145,177

[22] Filed: Jan. 19, 1988

[51] Int. Cl.⁴ .............................................. G21C 7/36
[52] U.S. Cl. ..................................... 376/216; 364/554
[58] Field of Search ............... 376/215, 216, 217, 218, 376/254; 364/492, 551, 554, 571

[56] References Cited

U.S. PATENT DOCUMENTS 4,637,910  1/1987  Impink ................................ 376/216
4,717,528  1/1988  Meyer ................................. 376/237

OTHER PUBLICATIONS

A. F. Henry, "The Application of Reactor Kinetics to the Analysis of Experiments", Nuclear Science and Engineering: 3, 52–70 (1958).
Westinghouse, "Digital Reactivity Computer", (Westinghouse Brochure).
Cesar A. Sastre, "The Measurement of Reactivity", Nuclear Science and Engineering: 8, 443–447 (1960).
J. Moreira and J. C. Lee, "Space-Time Analysis of Reactor-Control Rod-Worth Measurements", Nuclear Science and Engineering: 86, 91–105 (1984).
J. Moreira and J. C. Lee, "Accuracy of the Modal-Local Method for Reactivity Determination".

*Primary Examiner*—Donald P. Walsh

[57] ABSTRACT

A smart reactivity computer is disclosed that processes signals from multiple neutron detectors to generate values of regional core reactivity that are output to a strip chart recorder. The computer compares the regional reactivity values and, when the values are coincident for a period sufficient to satisfy a statistical fit test to a straight line, indicates to the operator that true core reactivity can be determined. The computer determines control rod worth by first fitting a straight line to the coincident portion of the reactivity values. The computer then determines intersections between the straight line and the reactivity value lines produced when the control rods are moved on both ends of the straight line. The difference between intersections for a single control rod movement line determines control rod worth for that movement.

8 Claims, 5 Drawing Sheets

CORE REACTIVITY VALIDATION COMPUTER AND METHOD

BACKGROUND OF THE INVENTION

1. The Field of the Invention

The present invention is directed to a reactivity computer and method that allows the period for determining control rod worth to be minimized and, more particularly, to a system that verifies that control rod worth can be determined before indicating to an operator that the control rods in a nuclear reactor core can be moved.

2. Description of the Related Art

A requirement has long been in force that, at startup of each new operations cycle of a nuclear power plant, measurements be made to verify that the nuclear characteristics of an installed reactor core meet certain previously established acceptance criteria. Among the characteristics to be checked are certain differential and integral reactivity worths, such as control bank worths (the neutron absorbtion value of the control rods in a bank), moderator temperature coefficients, and the like.

It has also long been common practice to use an analog or digital "reactivity computer" to relate time dependent changes in core neutron flux level to instantaneous core reactivity. The well known algorithms used in making the relation are referred to as the "kinetics" equations. In practice, a continuous electrical signal derived from one or more neutron sensitive detectors and believed to be proportional to the neutron flux level in the core is input to an analog or digital computer programmed to solve the point kinetics equations and an output, usually analog, representative of core reactivity is generated by the computer and is supplied to a recording device, such as a strip chart recorder.

Methods of analysis and evaluation of the recorded reactivity traces developed over the years allow the user to extract from the recordings the values of various differential reactivity worths which are to be measured. These methods involve, among other things, the identification of certain nominally linear segments of the strip chart traces and the extrapolation of fits to the linear segments into portions of the record where the traces are not linear. If the fits of the lines on which the extrapolations are based are not correct, either because of analyst error or because the nominally linear segment of the strip chart trace is not truly linear, the values of the reactivity worths extracted will be incorrect, erroneous conclusions regarding the characteristics of the .re will be drawn and conceivably a potentially hazardous condition could pass undetected.

Certain nuclear properties of the large reactor cores found in a modern nuclear power plant can give rise to changes in the neutron flux distribution or shape in the core in response to a perturbation in the core, typically control rod movement. This flux redistribution temporarily "confuses" the reactivity computer and results in phenomena called "overshoots" and "undershoots" in the recorded reactivity traces. The "overshoots" and "undershoots" cause segments of the reactivity traces that should be linear to be initially non-linear and, if not properly accounted for, give rise to the errors in the extrapolation noted above and to the consequences of such errors. The suspicion always exists that, even if the analyst conscientiously follows the established methods of analysis and evaluation, the results obtained may be incorrect. Special test data illustrated in FIG. 1, obtained during the recent startup of a nuclear power plant after refueling have yielded a clear and unambiguous demonstration that indeed conventional analysis and evaluation can yield detectably incorrect results.

During a period of reactivity measurement, the boron concentration in the reactor coolant system is continuously reduced at a nominally constant ate by normal dilution operations. The reduction in boron concentration gives rise to a continuous, linear increase in core reactivity which would appear on a single neutron detector reactivity trace as a line of constant positive slope. Movement of the control bank to compensate for the effects of continuous boron concentration reduction results in the abrupt reduction in core reactivity. Since the control rods move very quickly, with a time constant of about 1 second, and since the reduction in boron concentration is virtually linear in time, it is normally expected that the reactivity trace would consist of a linearly increasing segment, a nearly instantaneous negative step and another linearly increasing segment with the same slope as the first segment. Neutron flux redistribution in the reactor core in response to control rod movement gives rise to the otherwise unexpected non-linear behavior of the indicated reactivity trace in the time period following movement of the control rods.

FIG. 1 shows the indicated differential reactivity worth of a bank of control rods as seen by each of two neutron detectors which see different regions of the reactor core and which are affected differently by the flux redistribution in the reactor core caused by control rod movement. The fact that the two plots 10 (bottom detector) and 12 (top detector) of differential reactivity worth differ is clear evidence that at least one, and probably both, indicated measurements are invalid and ought not to be used to verify that the reactor can be operated safely. Therefore, what is needed is a device that performs the intended function of the reactivity computer in such a way that the errors noted above cannot occur, provided the test operations are carried out correctly, and that the results obtained can be demonstrated to be valid and correct within the accuracy of the values of the several physical constants that are used in solving the point kinetics equations.

SUMMARY OF THE INVENTION

It is an object of the present invention to determine core reactivity when all regions of the core show the same fractional rate of change in local neutron population.

It is another object of the present invention to determine stability in the rate of change by comparing reactivity from neutron detectors viewing different regions of the core.

It is another object of the present invention to allow the test period for determining control rod worth in a nuclear power reactor to be minimized.

It is an additional object of the present invention to avoid pretest calculations concerning reactor settling time and allow the reactor to tell the operator when the settling down period is over.

The above objects can be attained by a smart reactivity computer that processes signals from multiple neutron detectors to generate indications of regional core reactivity. The computer compares the reactivity values from the different detectors and, when the values are coincident for a long enough time to satisfy the criteria of a standard statistical test, indicates to the operator that true core reactivity can be determined.

After the operator moves the control rods, the computer determines control rod worth using a statistical fit to the coincident portion of the reactivity values for the multiple neutron detectors and uses the fit from successive control rod movements to determine the reactivity change that occurred during the rod movement between the fitted lines.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 5, including

DESCRIPTION OF THE PREFERRED EMBODIMENTS

Figure 1:
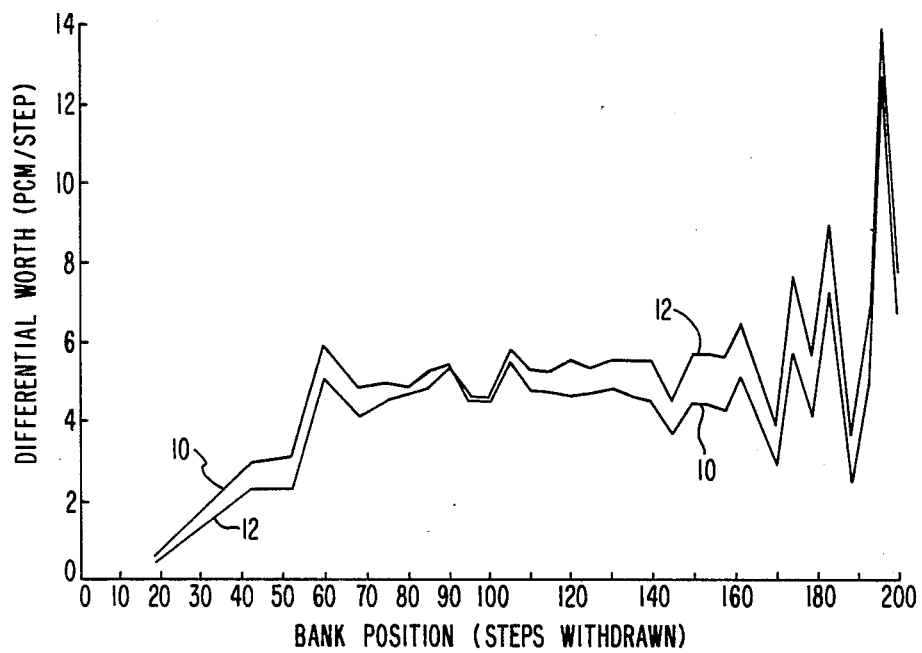
FIG. 1 illustrates reactivity worth determined from two different neutron detectors.

It is well known that the concept of reactivity is most readily applicable in a nuclear reactor core under the condition that the fractional rate of change of neutron population is identically the same in all regions of the core or, equivalently, that the shape of the neutron flux distribution is static.

The present invention instead of accepting a single signal believed to be representative of neutron flux level in the core and passing the information in that signal through a single "solver" of the point kinetics equations, accepts two or more such input signals and processes the information carried by the respective signals through identical, but independent, "solvers" of the point kinetics equations. The output reactivity values generated by the several "solvers" are then compared and when all of the independent reactivity values agree within a preset tolerance, the average of all the independent values is accepted as a valid measure of the instantaneous core reactivity.

A minimum acceptable set of input signals to be processed by the reactivity computer of the present invention consists of the signals generated by the top section and the bottom section of a single long ion chamber, provided that only symmetric perturbations in the radial neutron flux distribution occur as the measurement progresses. Signals generated by one or more movable incore detectors or by suitable fixed incore detectors temporarily or permanently positioned in appropriate locations within the reactor core would be highly desirable supplements to this minimum acceptable set of input signals. In the event that non-symmetric perturbations to the core neutron flux distribution are involved in the measurements being performed such as would result from a single control rod withdrawal or insertion or an N-1 worth test, signals from all available long ion chamber sections would constitute a minimum acceptable input signal set. The present invention also requires that boron dilution between rod movements be done at a constant rate for maintaining a very nearly just critical configuration in the reactor at zero power level.

The present invention also accepts the instantaneous reactivity values determined by the methodology mentioned above to be valid and continuously, within the unavoidable discrete time step character of digital processing, generates a linear fit in time to the current set of acceptable instantaneous reactivity values and subjects the fit so generated to a statistical test of acceptability. When enough valid data have been collected and processed, as indicated by acceptance on statistical grounds of the fit of the reactivity value variation versus time, a set of values of current time, reactivity and rate of change of reactivity, i.e., slope of the fit, is recorded. Using this set of values, the fit of reactivity versus time is extrapolated back in time t the time of the most recent earlier set of values and the change in reactivity associated with the most recent control bank movement is evaluated and reported to the user. When a sufficient number of acceptable reactivity values have been produced or when an acceptable fit to the current reactivity variation has been obtained, a signal, which may be in the form of an activated indicator light, can be transmitted to the reactor operator to inform him that data collection and processing at the current rod position has been completed and that he may adjust control bank position and continue on with the measurement process.

Figure 2:
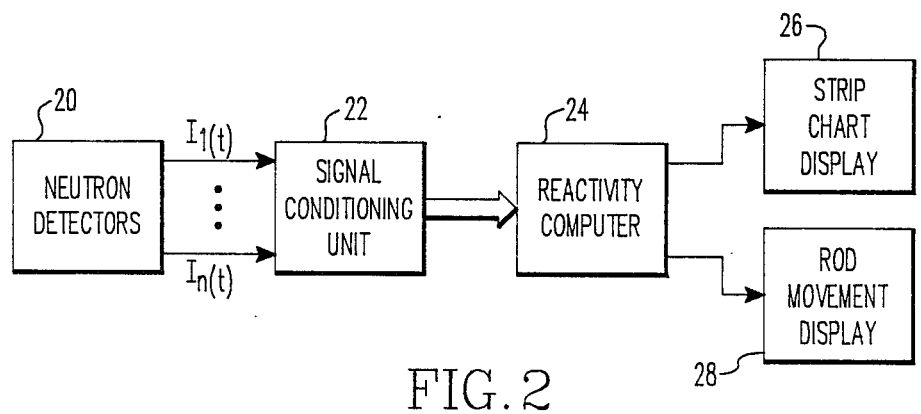
FIG. 2 is a block diagram of the components of the present invention.

A simplified block diagram of the system of the present invention is illustrated in FIG. 2. At least two neutron detectors 20 detect the neutron flux produced in the reactor core and produce electrical current signals proportional to the flux detected. The current signals are processed by a conventional signal conditioning unit 22 and supplied to a reactivity computer 24 as analog values. The reactivity computer 24 can include the same conventional digital reactivity computer that determines reactivity from a single channel neutron detector. A suitable pair of single channel digital reactivity computer that can be connected to a personal computer, such as an IBM PC-AT, to form the reactivity computer 24 for a two neutron detector system can be obtained from Westinghouse. The reactivity computer 24 determines the reactivity in the core for different regions by averaging typically ten samples for each detector taken over a period of approximately 10 milliseconds, solves the known point kinetics equations, and displays these instantaneous reactivities on a strip chart recorder type display 26. When the reactivities produced by the plural neutron detectors remain coincident for a long enough time to satisfy a statistical test of "goodness" such as The Standard Error of Estimate Test, the reactivity computer 24 signals an operator via display 28 that the currently measured reactivity is valid or correct, thereby allowing the operator to move the control rods by the next step increment. After rod movement, the reactivity computer 24 determines the control rod worth based on the coincident reactivity values and provides the operator with a differential control rod worth for the previous control rod movement.

Figure 3:
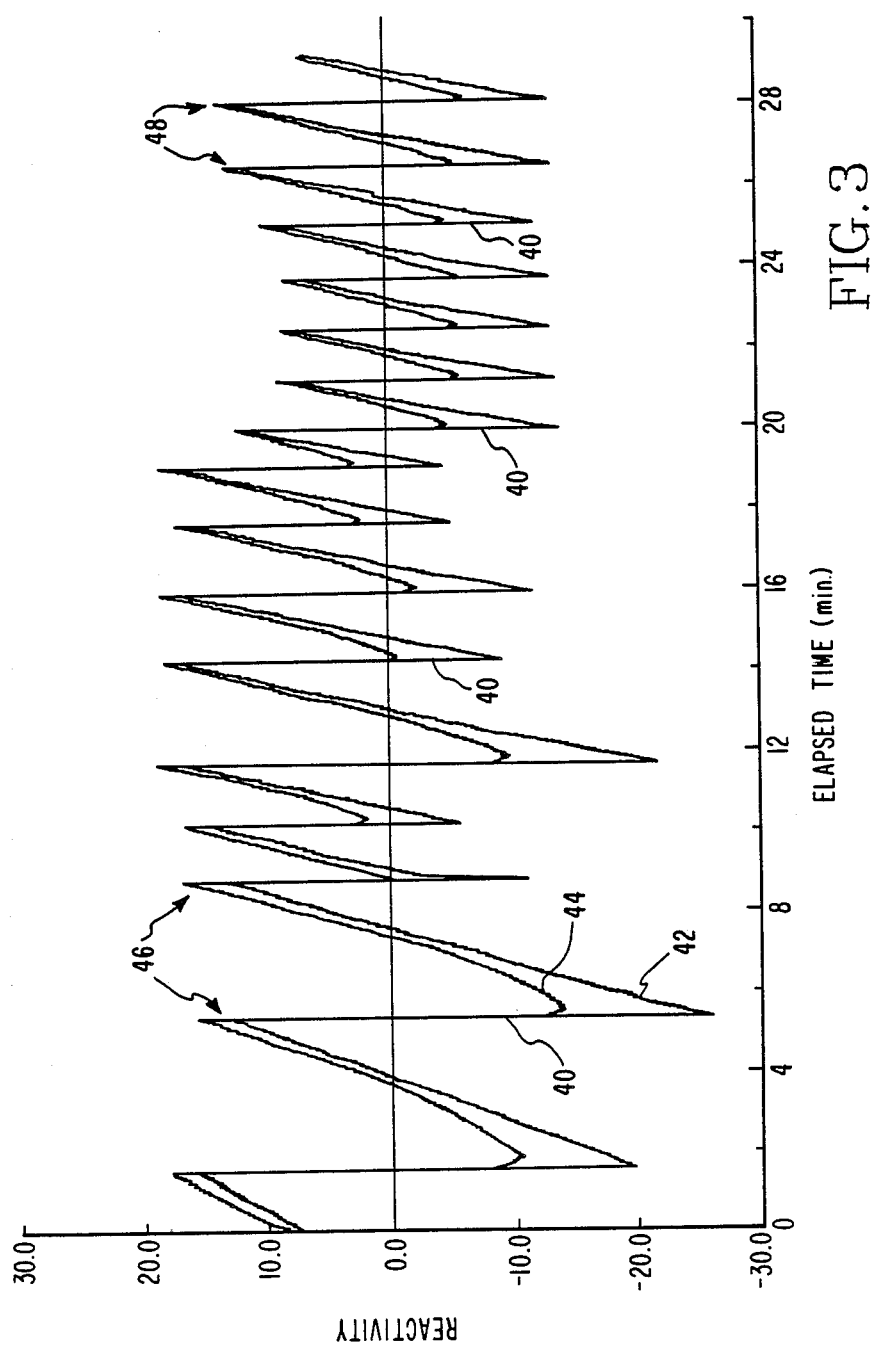
FIG. 3 is a reactivity versus time trace for two neutron detectors.
Figure 4:
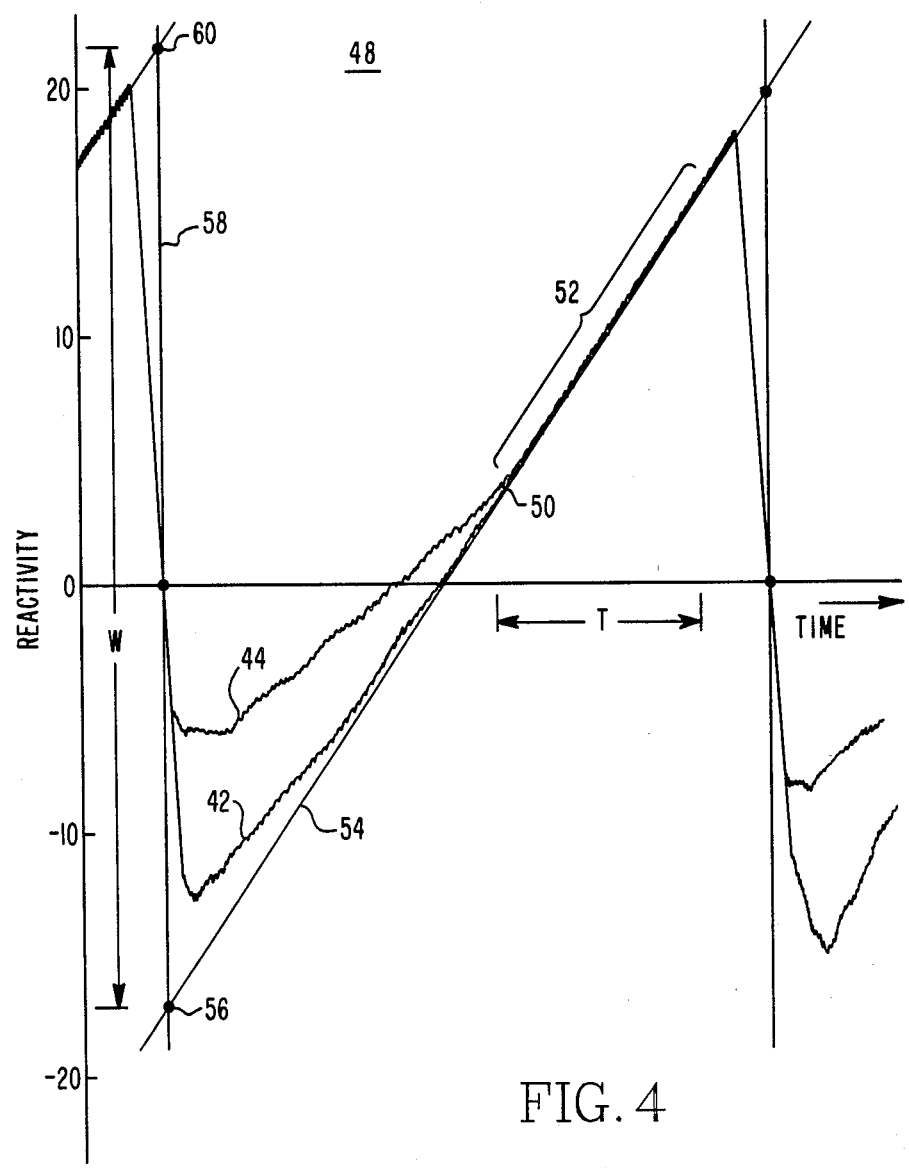
FIG. 4 is an enlargement of one section of the trace of FIG. 3.

FIG. 3 illustrates a typical reactivity trace produced by upper and lower neutron detectors provided exterior to the nuclear reactor core. The substantially vertical line 40 indicates the reactivity change that occurs during control rod movement from, for example, the 180 step position to the 190 step position. Once the control rods have been moved the reactivity trace 42 produced by the lower neutron detector. diverges from the trace 44 produced by the upper detector. During the period of reactivity change between control rod movements the reactivity is increasing because of the reduction of neutron absorbers (boron) in the coolant. During a period of constant dilution the traces of the detectors should be straight, and before the operator is allowed to move the control rods a second time, the rate of reactivity change must stabilize into substantially a straight line. The portions 46 in FIG. 3 indicate diverging reactivities measured by the upper and lower neutron detectors after the reactivity traces have crossed. The regions 46, where the reactivity traces 42 and 44 are not coincident and do not provide a substantially straight trace, are inappropriate for determining core reactivity and thus control rod worth. The regions 48 identified in FIG. 3 are regions where core reactivity is valid because the traces are coincident and straight. This general area of FIG. 3 is illustrated substantially enlarged in FIG. 4.

The present invention compares the instantaneous reactivities of the lower 42 and upper 44 detectors looking for the first point of coincidence 50 that can be identified. Coincidence occurs when the reactivity values are within 0.5% of the largest expected step reactivity change during measurements. After coincidence begins, the present invention requires that coincidence be maintained for a time period T sufficient to allow a statistical fit to be made. When coincidence has continued for the time period T, the operator can be signaled indicating that control rod movement can be performed. A least squares fit to the coincidence reactivity 52 values occurring during the time period T is performed to produce a straight line 54 and the corresponding slope intercept form equation for the straight line 54. The computer then determines the intersection 56 of the straight line 54 and vertical line 58. The vertical line 58 passes through the point where reactivity equals zero during control rod movement. Control rod worth is then determined by the reactivity difference between point 56 and a point 60 where the previous fitted straight line intersects the vertical line 58. The control rod worth for the control rod movement associated with vertical line 58 is then provided to the operator on display 28.

Figure 5A:
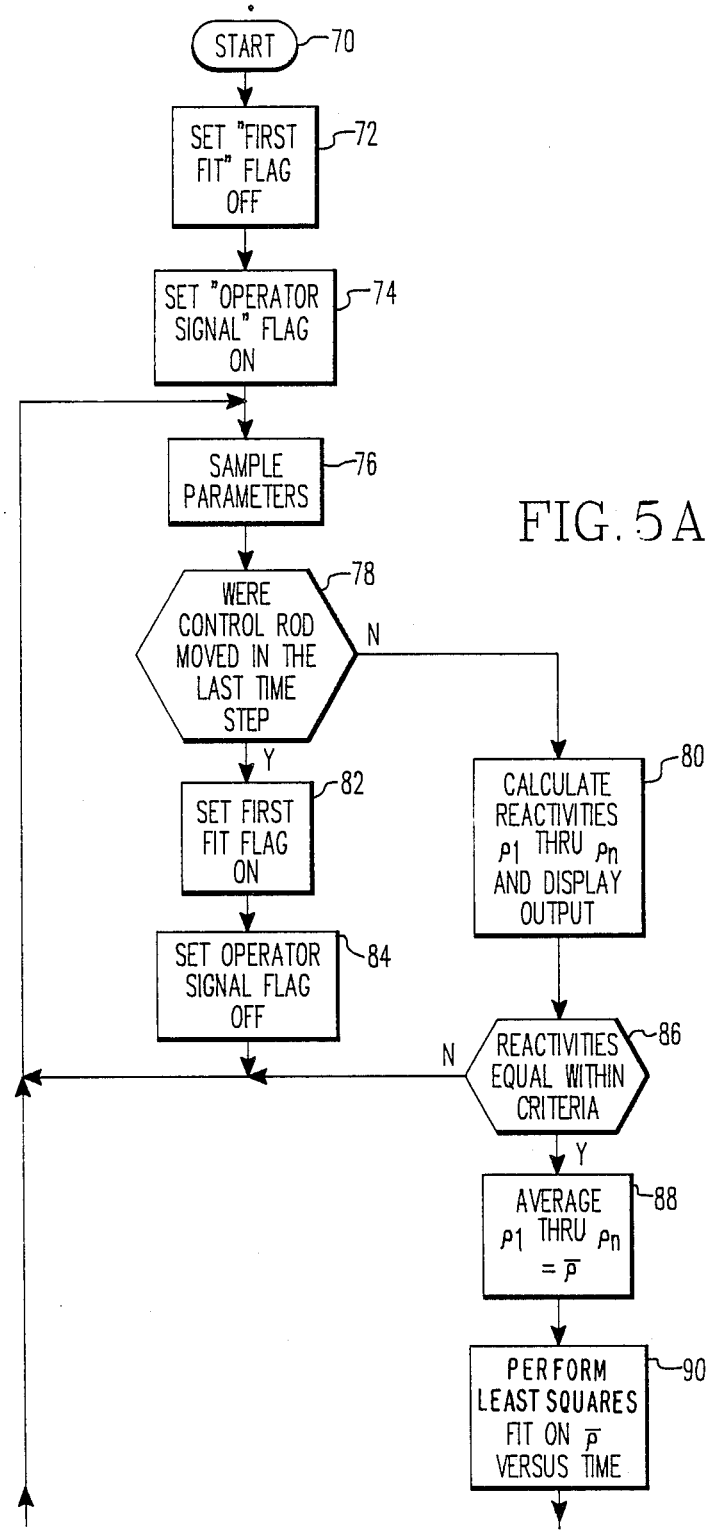
FIGS. 5A and 5B, is a computer flowchart of the process performed by the present invention.
Figure 5B:
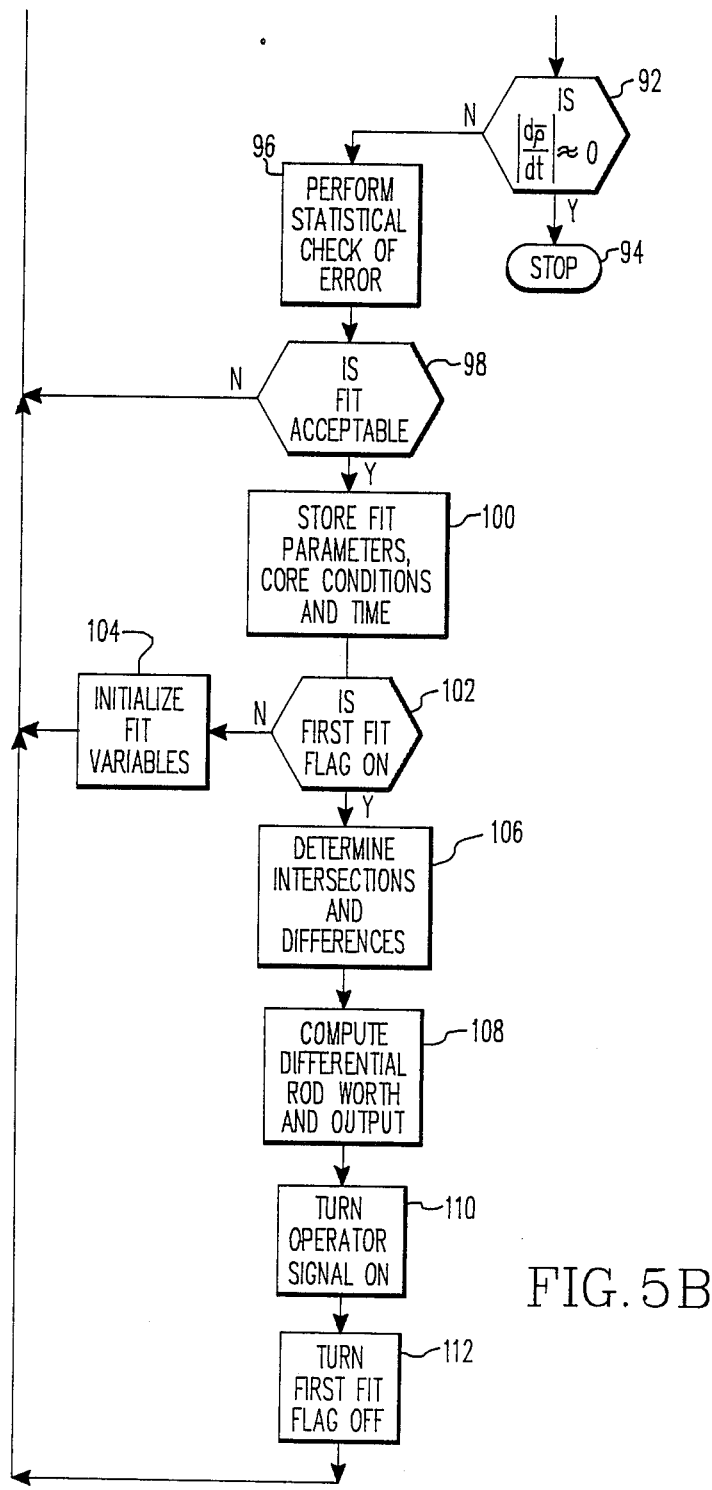

The process described above is illustrated by the flowchart of FIG. 5. A suitable language for the corresponding digital computer program is PASCAL. The process starts 70 by setting 72 and 74. a first fit flag to off and an operator signal flag to on. The first fit flag is set when a new measurement cycle is started. The on operator flag tells the operator the control rods can be moved. A control rod movement by the operator causes the reactivity and the flux distribution in the core to change abruptly. After setting the flag, the reactivity computer 24 takes 10 samples 76 of the flux values produced by each neutron detector along with other parameters necessary to determine reactivity such as time and control rod position. If the control rods were not moved in the last time step 78, the computer 24 averages the values, calculates 80 the reactivities associated with each flux detector, stores the calculated reactivity values and outputs the values to the strip chart recorder. If the control rods were moved in the last time step, the first fit flag is set 82 and the operator signal flag is turned 84 off.

A commonly used reference for calculating reactivity,,as in step 80, is A. F. Henry's paper. "The Application of Reactor Kinetics to the Analysis of Experiments", Nuclear Science and Engineering: 3, 52–70 (1958). In this paper Henry derives the well known reactor kinetics equations which appear as equation 6 in the paper. Equation 6 requires that the conditions of equation 5 there,in be satisfied before the simplification of equation 6 will be valid. Equation 5 essentially requires that the reactor settle down to a steady rate of change state before reactivity can be measured. This settling down period is typically from 2 to 4 minutes after control rod movement. When the settling down has occurred, the coincidence between detector reactivity values begins.

It is conventional to make measurements of core reactivity under conditions in which the source term Q of the Henry equations is a negligible contributor to the neutron balance and in a situation where the time derivative term dT(t)/dt very quickly becomes of negligible consequence after a perturbation in the core properties. With these two simplifications equation 6 of the Henry paper will produce:

$$\rho(t) = \beta = (\Lambda/T(t)) \sum_i \lambda_i C_i(t) \quad (1)$$

$$\Lambda dC_i(t)/dt = \beta_i T(t) = \lambda_i \Lambda C_i(t) \quad (2)$$

and subsequently $$\rho(t) = \beta - (1/T(t)) \sum_i \lambda_i \hat{C}_i(t) \quad (3)$$

$$d\hat{C}_i(t)/dt = \beta_i T(t) - \lambda_i \hat{C}_i(t) \quad (4)$$

where $$\hat{C}_i = \Lambda C_i \quad (5)$$

It is of course impractical to measure the actual value of the amplitude function T(t) of a large nuclear reactor. Hence, the assumption is routinely made that the response signal from a suitably located neutron detector is proportional to the value of the amplitude function at any given time. Thus, $$T(t) = \mu DR(t) \quad (6)$$

where DR(t) is the magnitude of the detector response signal and the equations actually solved are $$\rho(t) = \beta - (1/DR(t)) \sum_i \lambda_i \hat{\hat{C}}_i(t) \quad (7)$$

$$d\hat{\hat{C}}_i/dt = \beta_i DR(t) - \lambda_i \hat{\hat{C}}_i(t) \quad (8)$$

where $$\hat{\hat{C}}_i(t) = \Lambda \mu C_i(t) \quad (9)$$

In this final form the equation set is commonly referred to as the "point kinetics" equations. Continuous, online evaluation of the reactivity of a large nuclear reactor core and of changes in the reactivity resulting from externally produced changes in core properties can be accomplished readily by solving the set of simultaneous linear and differential equations discussed above.

Once the reactivities are determined by the point kinetics equations, a determination is made 86 concerning whether the reactivities are equal, that is, the reactivities are considered equal when they are all within a preselected variance of each other. This is done for all reactivities produced, by comparing each reactivity with all other determined reactivities if more than two neutron detectors are used in the comparisons. If the reactivities are not equal 86, the process cycles back to sample the measurement parameters again. If the reactivities are within the preselected variance, the average reactivity is produced 88. The average is then used with the previously stored average reactivities to perform a least squares fit 90 versus time. If the rate of change is approximately zero 92 the process is stopped 94. If the rate of change is not approximately equal to zero, a statistical check 96 of the fit of the values using the Standard Error of Estimate Test is performed 96. If the fit is not acceptable 98, a new set of parameters is obtained and the process is repeated. If the fit is acceptable, the fit parameters, core conditions and time are stored 100. If the first fit flag is not on 102, the fit variables are initialized 104 and a new set of parameters are sampled. This allows the process to produce a new fit if the operator does not promptly move the control rods. If a new fit is obtained it is used for future differential worth calculations. If the fit flag is on, the intersections and differences are determined 106 in accordance with the procedures described with respect of FIG. 4. The differences are then used to compute 108 the differential rod worth which is output to the operator after which the operator signal flag is turned on 110. The first fit flag is also turned on 112 after which the process returns to obtain new sample parameters.

Once the operator has the last control rod worth for the insertion steps, the operator compares these values to a chart produced by the core designer for the latest fuel loading. The comparison will show whether the design values are accurate.

It is possible, though not desirable for safety reasons, to allow the reactivity computer 24 to initiate control rod movement when the period for coincidence has been detected, rather than wait for the operator to move the rods. This would further improve the efficiency of the control rod worth test. It is also possible to vary the time period required for coincidence before reactivity values are validated by setting tighter or less restrictive statistical criteria of "goodness". A further improvement in the present invention would be to calculate boron balance (or worth) and measure reactor temperature, and provide these values as outputs along with reactivity and control rod worth.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of core reactivity validation, comprising the steps of:
    (a) determining at least two core reactivities using at least two neutron detectors; and
    (b) comparing the core reactivities and indicating that the reactivities are valid when the reactivities are substantially coincident.

2. A method as recited in claim 1, wherein step (b) includes indicating valid reactivities after substantial coincidence occurs sufficient to satisfy a statistical fit test.

3. A method as recited in claim 2, further comprising the step of (c) determining control rod worth after valid reactivities are indicated.

4. A method as recited in claim 3, wherein step (b) includes the step of performing a straight line fit to the substantially coincident reactivities, and step (c) comprises the steps of:
    (c1) determining intersections between the straight line fit and a vertical line constructed through a point at which reactivity passes through zero during control rod movement; and
    (c2) producing as differential control rod worth a difference between the intersections.

5. A method of determining worth of control rods, comprising the steps of:
    (a) sampling neutron flux detected by at least two neutron detectors;
    (b) determining at least two reactivities from the flux;
    (c) comparing reactivities from multiple samples and determining coincidence between the reactivities;
    (d) fitting a straight line to the coincident reactivities;
    (e) determining whether the straight line satisfies a statistical fit test;
    (f) determining intersections between the straight line and a vertical line constructed through a point at which reactivity passes through zero during control rod movement; and
    (g) determining a reactivity difference as a distance between the intersections.

6. A validation apparatus for core reactivity, comprising:
    at least two neutron detectors producing core flux values;
    reactivities from the flux values;
    means for determining at least two reactivities and computation means for comparing the reactivities and alerting an operator when the reactivities are substantially coincident.

7. An apparatus as recited in claim 6, further comprising control rod worth means for determining control rod worth from the substantially coincident reactivities.

8. An apparatus as recited in claim 7, wherein said control rod worth means comprises:
    means for fitting a straight line to the substantially coincident reactivities; and
    means for determining control rod worth from intersections between the straight line and core reactivity before and after control rod movement.

* * * * *